(12) United States Patent
Yamada et al.

(10) Patent No.: US 11,440,293 B2
(45) Date of Patent: Sep. 13, 2022

(54) LAYERED PRODUCT

(71) Applicant: DAIKIN INDUSTRIES, LTD., Osaka (JP)

(72) Inventors: Masahiko Yamada, Osaka (JP); Yutaka Nakata, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 118 days.

(21) Appl. No.: 16/758,285

(22) PCT Filed: Sep. 26, 2018

(86) PCT No.: PCT/JP2018/035661
§ 371 (c)(1),
(2) Date: Apr. 22, 2020

(87) PCT Pub. No.: WO2019/082582
PCT Pub. Date: May 2, 2019

(65) Prior Publication Data
US 2020/0324520 A1 Oct. 15, 2020

(30) Foreign Application Priority Data

Oct. 24, 2017 (JP) .............................. JP2017-205221

(51) Int. Cl.
*B32B 17/04* (2006.01)
*B32B 5/02* (2006.01)
(Continued)

(52) U.S. Cl.
CPC .............. *B32B 17/04* (2013.01); *B32B 5/024* (2013.01); *B32B 5/24* (2013.01); *B32B 17/10* (2013.01);
(Continued)

(58) Field of Classification Search
CPC ...... D10B 2101/06; D04B 1/14; D04B 21/00; D03D 15/00; D03D 15/267; D02G 1/165;
(Continued)

(56) References Cited

U.S. PATENT DOCUMENTS

| 6,994,908 B1 * | 2/2006 | Ishiwari ................. B32B 27/30 |
| | | 428/422 |
| 2010/0316864 A1 | 12/2010 | Yoshida |
| 2014/0120792 A1 * | 5/2014 | Yoshida ................ B30B 15/061 |
| | | 442/67 |

FOREIGN PATENT DOCUMENTS

| CN | 103785224 | * | 5/2014 |
| JP | 49-17875 A | | 2/1974 |

(Continued)

OTHER PUBLICATIONS

International Preliminary Report on Patentability with the translation of Written Opinion dated Apr. 28, 2020, from the International Bureau in International Application No. PCT/JP2018/035661.
(Continued)

*Primary Examiner* — Camie S Thompson
(74) *Attorney, Agent, or Firm* — Sughrue Mion, PLLC

(57) ABSTRACT

The invention provides a layered product in which a glass cloth and a fluororesin-containing sheet are firmly bonded to each other even without providing a layer of polytetrafluoroethylene fine particles and without recrystallizing the fluororesin. The layered product includes, in a layered structure, a fluororesin-containing sheet, a hot-melt resin layer, and a glass cloth. The glass cloth is a fabric including a bulked glass yarn.

3 Claims, 2 Drawing Sheets

(51) Int. Cl.
| | |
|---|---|
| *B32B 5/24* | (2006.01) |
| *B32B 17/10* | (2006.01) |
| *B32B 27/12* | (2006.01) |
| *B32B 27/28* | (2006.01) |
| *D02G 1/16* | (2006.01) |
| *D02G 3/18* | (2006.01) |
| *D03D 15/267* | (2021.01) |

(52) U.S. Cl.
CPC .............. *B32B 27/12* (2013.01); *B32B 27/28* (2013.01); *D02G 1/165* (2013.01); *D02G 3/18* (2013.01); *D03D 15/267* (2021.01); *B32B 2260/021* (2013.01); *B32B 2260/046* (2013.01); *B32B 2262/101* (2013.01); *D10B 2101/06* (2013.01)

(58) Field of Classification Search
CPC .......... D02G 3/18; B32B 17/04; B32B 17/10; B32B 2250/02; B32B 2260/021; B32B 2260/046; B32B 27/18; B32B 27/12; B32B 5/024; B32B 5/24; B32B 7/12; B32B 27/28
USPC .......................................... 442/289; 428/422
See application file for complete search history.

(56) References Cited

FOREIGN PATENT DOCUMENTS

| | | | |
|---|---|---|---|
| JP | 55-103371 | A | 8/1980 |
| JP | 61-294285 | A | 12/1986 |
| JP | 63-116845 | A | 5/1988 |
| JP | 04-327237 | * | 11/1992 |
| JP | 6-39220 | A | 2/1994 |
| JP | 08-074174 | A | 3/1996 |
| JP | 2002-283517 | A | 10/2002 |
| JP | 3384395 | B2 | 3/2003 |
| JP | 33843945 | B2 | 3/2003 |
| JP | 2012-001932 | A | 1/2012 |
| JP | 2016-159579 | A | 9/2016 |
| JP | 2017-100341 | A | 6/2017 |
| JP | 2018-084097 | A | 5/2018 |
| TW | 200902305 | A | 1/2009 |
| WO | 00/10805 | A1 | 3/2000 |

OTHER PUBLICATIONS

International Search Report for PCT/JP2018/035661 dated Nov. 27, 2018 (PCT/ISA/210).

* cited by examiner

LAYERED PRODUCT

CROSS REFERENCE TO RELATED APPLICATIONS

This application is a National Stage of International Application No. PCT/JP2018/035661 filed Sep. 26, 2018, claiming priority based on Japanese Patent Application No. 2017-205221, filed Oct. 24, 2017.

TECHNICAL FIELD

The invention relates to layered products.

BACKGROUND ART

A variety of liquid chemicals are widely used as materials or cleaning agents in a various chemical plants, such as manufacturing of semiconductors. Some of these liquid chemicals have high reactivity or corrosiveness, so that the inner walls of containers and pipes for storage or transport of such liquid chemicals are usually provided with a layered product called a backing sheet. A surface of the backing sheet to be in contact with a liquid chemical needs to be formed from a material having good chemical resistance. Used in usual cases are sheets having excellent chemical resistance, particularly polytetrafluoroethylene (PTFE) sheets.

A conventionally known backing sheet is one including a PTFE sheet with a heat-resistant textile such as glass fiber textile or carbon fiber textile being bonded thereto. For example, Patent Literature 1 proposes a layered product having a layered structure of a polytetrafluoroethylene sheet having an average specific gravity of 2.175 or higher and a heat-resistant textile with a hot-melt resin layer in between.

Although it is not intended for the use as a backing sheet, Patent Literature 2 proposes a non-flammable, heat-resistant flexible material including, as a reinforcing fabric, a glass fiber woven fabric composed of a bulked glass microfiber yarn with at least one surface of the reinforcing fabric being covered with a fluororesin such as PTFE or FEP.

CITATION LIST

Patent Literature

Patent Literature 1: WO 00/10805
Patent Literature 2: JP S61-294285 A

SUMMARY OF INVENTION

Technical Problem

The glass fiber textile used for backing sheets is a fabric of a glass yarn. Conventionally used glass yarn is usually a straight yarn. Thus, in Patent Literature 1, a layer of PTFE fine particles needs to be provided between the PTFE sheet and the hot-melt resin layer. When no layer of PTFE fine particles is provided, the heating duration for thermal bonding of the PTFE sheet and the hot-melt resin layer needs to be prolonged so as to achieve recrystallization of molten PTFE in the PTFE sheet. When no layer of PTFE fine particles is provided and no recrystallization of PTFE is performed, the PTFE sheet and the heat-resistant textile are insufficiently bonded to each other.

In view of the above current state of the art, the invention aims to provide a layered product in which a glass cloth and a fluororesin-containing sheet are firmly bonded to each other even without providing a layer of PTFE fine particles and without recrystallizing the fluororesin.

Solution to Problem

The invention relates to a layered product including, in a layered structure, a fluororesin-containing sheet, a hot-melt resin layer, and a glass cloth, the glass cloth being a fabric including a bulked glass yarn.

Preferably, the hot-melt resin layer and the glass cloth are layered so as to be in contact with each other, the glass cloth is woven in a twill pattern, and the bulked glass yarn is used for at least one selected from a warp and a weft of the glass cloth and appears on a surface in contact with the hot-melt resin layer of the glass cloth.

Preferably, the bulked glass yarn includes intertwined glass filaments, and the glass cloth includes, on a surface in contact with the hot-melt resin layer, a layer impregnated with the hot-melt resin between strands of the bulked glass yarn and between the glass filaments.

The fluororesin-containing sheet is preferably a polytetrafluoroethylene (PTFE) sheet.

The PTFE sheet preferably has an average specific gravity of 2.175 or higher.

The bulked glass yarn preferably has a bulking percentage of 101% to 150%.

Advantageous Effects of Invention

The layered product of the invention has the aforementioned structure, and thus the glass cloth and the fluororesin-containing sheet are firmly bonded to each other even without providing a layer of PTFE fine particles and without recrystallizing the fluororesin.

DESCRIPTION OF EMBODIMENTS

Figure 1:
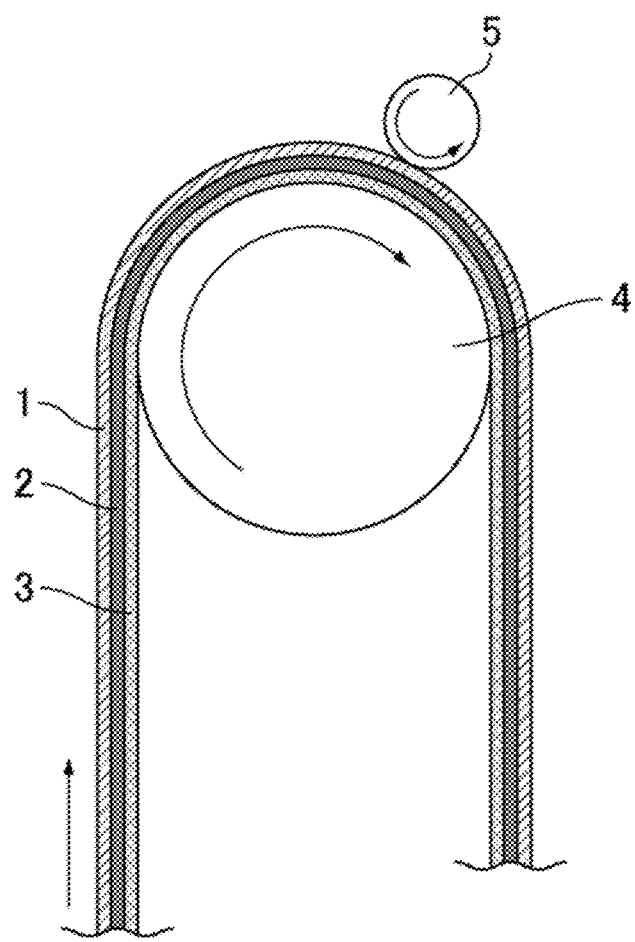
FIG. 1 is a schematic view of an exemplary thermal bonding method using a heating roller.

The invention is described in detail below.

The layered product of the invention includes a glass cloth, and the glass cloth is a fabric including a bulked glass yarn. The glass cloth including a bulked glass yarn, i.e., a glass yarn after bulking, has a larger apparent surface area than a glass cloth of a non-bulked glass yarn, i.e., a glass yarn without bulking (straight yarn). Thus, the hot-melt resin easily impregnates into the glass cloth when the hot-melt resin layer is molten, resulting in firm bonding of the hot-melt resin layer and the glass cloth. Further, the glass cloth has a larger contact area with the fluororesin-containing sheet with the hot-melt resin layer in between, resulting in an anchoring effect that leads to firmer bonding. The glass cloth including a bulked glass yarn has high flexibility and excellent conformability to the fluororesin-containing sheet. This can provide a layered product in which the glass cloth and the fluororesin-containing sheet are firmly bonded to each other even without providing a layer of PTFE fine particles and without recrystallizing the fluororesin. Further, the glass cloth is less likely to break when the layered product is bent.

The bulking is one of techniques for increasing the volume of fibers and is also called texturing. In the case of a glass yarn, the bulking is performed by supplying a glass yarn into a high speed air jet nozzle at a certain drawing rate and exposing the glass yarn to a turbulent flow of the air at a winding rate lower than the drawing rate to cause opening of the glass yarn.

The bulked glass yarn preferably includes intertwined glass filaments. The glass filaments preferably have an average diameter of 2 to 10 µm, more preferably 4 to 7 µm. The number of glass filaments intertwined together is preferably 200 to 6000, more preferably 400 to 2400. Examples of the glass yarn used include yarns of D-glass, DE-glass, E-glass, G-glass, or the like generally known as representing the nominal diameters (symbols) of glass staple fibers.

The bulked glass yarn may be used in the form of a single yarn or of a doubled and twisted yarn of multiple yarns intertwined.

The bulked glass yarn preferably has a count (yarn weight) of 30 to 200 tex, more preferably 50 to 100 tex.

In order to firmly bond the glass cloth and the hot-melt resin layer, the bulked glass yarn preferably has a bulking percentage of 101% or higher, more preferably 103% or higher, still more preferably 105% or higher. The upper limit of the bulking percentage may be, but is not limited to, 200%, for example. In processing of the glass yarn into a fabric, the upper limit of the bulking percentage is preferably 150%, more preferably 130%, still more preferably 120%.

The bulking percentage is a value determined by the ratio of the count (yarn weight) of the bulked glass yarn and the count (yarn weight) of the glass yarn before bulking.

The count (yarn weight) of the bulked glass yarn is the weight of the glass yarn per unit length. The count (yarn weight) of the glass yarn before bulking is the weight determined from the thicknesses of the glass filaments and the total number of the filaments.

The fabric may be either a woven fabric or a knitted fabric, and is produced by weaving or knitting the bulked glass yarn, optionally together with a non-bulked glass yarn. Examples of methods of weaving or knitting the glass yarn include known methods using a weaving or knitting machine. Specific examples thereof include weaving of glass fibers using a jet loom (e.g., an air jet loom or a water jet loom), a Sulzer loom, or a rapier loom. Examples of weaving methods (weaving patterns) for a woven fabric after warping and sizing of a glass yarn include plain weave, satin weave, mat weave, twill weave, leno weave, triaxial weave, and horizontal stripe weave. Examples of knitting methods (knitting patterns) for a knitted fabric include weft knit such as plain stitch, rib stitch, and purl stitch, warp knit such as single denbigh stitch, single cord stitch, and two needle stitch, lace stitch, float stitch, and pile stitch. The knitting may be performed using a known weft knitting machine or a warp knitting machine, such as a latch needle plain fabric circular knitting machine, a circular knitting machine, or a cotton's patent knitting machine. Preferred among these is a woven fabric in a twill pattern.

The glass cloth preferably includes a warp and a weft. In this case, the bulked glass yarn is preferably used for at least one selected from the warp and the weft. More preferably, the bulked glass yarn is used for one selected from the warp and the weft, while a non-bulked glass yarn is used for the other. Contact between the surface with the bulked glass yarn appearing thereon and the fluororesin-containing sheet of the layered product enables firm bonding of the glass cloth and the fluororesin-containing sheet. Further, use of the bulked glass yarn for at least one selected from the warp and the weft allows the glass cloth to have much better flexibility and thus to be much less likely to break when the layered product is bent.

For the glass cloth including the bulked glass yarn and a non-bulked glass yarn, the bulked glass yarn and the non-bulked glass yarn preferably give a mass ratio of 100/0 to 10/90, more preferably 100/0 to 40/60.

The glass cloth may have a thickness selected in accordance with the intended use, and may be 0.03 to 3.0 mm, for example. In the case of using the glass cloth for a backing sheet, the thickness is preferably 0.1 to 0.5 mm.

The layered product of the invention includes a fluororesin-containing sheet. The fluororesin as used herein means a partially crystalline fluoropolymer and is a fluoroplastic. The fluororesin has a melting point and thermoplasticity, and may be either melt-fabricable or non melt-processible.

The melt-fabricable as used herein means that a polymer can be processed in a molten state using a conventional processing device such as an extruder or an injection molding machine. Thus, a melt-fabricable fluororesin usually has a melt flow rate of 0.01 to 100 g/10 min which is determined at a temperature higher than the crystal melting point in conformity with ASTM D-1238 and D-2116.

The non melt-processible as used herein means that a polymer cannot be processed in a molten state using a conventional processing device such as an extruder or an injection molding machine. Specifically, the non melt-processible means a characteristic feature of a polymer such that the melt flow rate cannot be measured at a temperature higher than the crystal melting point in conformity with ASTM D-1238 and D-2116.

The fluororesin in the invention preferably has a melting point of 100° C. to 360° C., more preferably 140° C. to 350° C., still more preferably 160° C. to 350° C., particularly preferably 180° C. to 350° C.

The melting point of the fluororesin as used herein means the temperature corresponding to the maximum value on a heat-of-fusion curve determined by increasing the temperature at a rate of 10° C./min using a differential scanning calorimeter (DSC).

Examples of the fluororesin include polytetrafluoroethylene (PTFE), a tetrafluoroethylene (TFE)/perfluoro(alkyl vinyl ether) (PAVE) copolymer (PFA), a TFE/hexafluoropropylene (HFP) copolymer (FEP), an ethylene (Et)/TFE copolymer (ETFE), a TFE/vinylidene fluoride (VDF) copolymer, an Et/TFE/HFP copolymer, polychlorotrifluoroethylene (PCTFE), a chlorotrifluoroethylene (CTFE)/TFE copolymer, an Et/CTFE copolymer, polyvinylidene fluoride (PVDF), and polyvinyl fluoride (PVF). Preferred among these is PTFE.

The PTFE may be either a homo PTFE consisting of a TFE unit or a modified PTFE containing a TFE unit and a modifying monomer unit based on a modifying monomer copolymerizable with TFE, and is preferably a modified PTFE. The PTFE is preferably a non melt-processible, fibrillatable, high molecular weight PTFE.

The modifying monomer may be any monomer copolymerizable with TFE. Examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkyl ethylene; ethylene; and fluorine-containing vinyl ether containing a nitryl group. One modifying monomer may be used or multiple modifying monomers may be used.

An example of the perfluorovinyl ether is, although not limited thereto, an unsaturated perfluoro compound represented by the following formula (1):

(wherein $Rf^1$ is a perfluoro organic group). The term "perfluoro organic group" as used herein means an organic group obtained by replacing all hydrogen atoms binding to any carbon atom by fluorine atoms. The perfluoro organic group may contain ether oxygen.

An example of the perfluorovinyl ether is perfluoro(alkyl vinyl ether) (PAVE) represented by the formula (1) wherein $Rf^1$ is a C1-C10 perfluoroalkyl group. The perfluoroalkyl group preferably has a carbon number of 1 to 5.

Examples of the perfluoroalkyl group in PAVE include a perfluoromethyl group, a perfluoroethyl group, a perfluoropropyl group, a perfluorobutyl group, a perfluoropentyl group, and a perfluorohexyl group. Preferred is perfluoropropyl vinyl ether (PPVE) in which the perfluoroalkyl group is a perfluoropropyl group.

Examples of the perfluorovinyl ether also include those represented by the formula (1) wherein $Rf^1$ is a C4-C9 perfluoro(alkoxyalkyl) group, $Rf^1$ is a group represented by the following formula:

[Chem. 1]

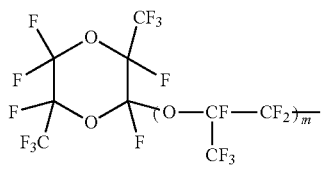

(wherein m is 0 or an integer of 1 to 4), or $Rf^1$ is a group represented by the following formula:

[Chem. 2]

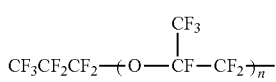

wherein n is an integer of 1 to 4.

Examples of the perfluoroalkyl ethylene include, but are not limited to, perfluorobutyl ethylene (PFBE) and perfluorohexyl ethylene.

The fluorine-containing vinyl ether containing a nitryl group is more preferably a fluorine-containing vinyl ether represented by $CF_2$=$CFORf^2CN$, wherein $Rf^2$ is a C2-C7 alkylene group in which an oxygen atom is optionally present between two carbon atoms.

The modifying monomer in the modified PTFE is preferably at least one selected from the group consisting of PAVE and HFP, more preferably PAVE.

The modified PTFE preferably contains a modifying monomer unit in an amount within a range of 0.0001 to 1% by mass. The lower limit of the amount of the modifying monomer unit is more preferably 0.001% by mass, still more preferably 0.01% by mass, particularly preferably 0.05% by mass. The upper limit of the amount of the modifying monomer unit is more preferably 0.5% by mass, still more preferably 0.3% by mass.

In the description, the amounts of the monomer units constituting the fluororesin can be calculated by appropriate combination of NMR, FT-IR, elemental analysis, and X-ray fluorescence analysis in accordance with the types of the monomers.

The PTFE preferably has a standard specific gravity (SSG) of 2.140 or higher, more preferably higher than 2.150, still more preferably 2.160 or higher, while preferably 2.210 or lower.

The standard specific gravity (SSG) can be determined by water displacement in conformity with ASTM D 4895-89.

The PTFE preferably has a melting point of 324° C. to 350° C., more preferably 327° C. to 347° C. The melting point is the temperature corresponding to the maximum value on a melting curve obtained by heating a PTFE that has never been heated up to a temperature of 300° C. or higher at a rate of 10° C./min using a differential scanning calorimeter (DSC), with the curve including at least one endothermic peak within a range of 324° C. to 347° C.

Preferably, the fluororesin-containing sheet is formed from the PTFE and has an average specific gravity of 2.175 or higher. The average specific gravity is more preferably higher than 2.175, still more preferably 2.178 or higher, while preferably 2.210 or lower.

The average specific gravity herein means the specific gravity of the whole fluororesin-containing sheet. For the fluororesin-containing sheet including a portion (layer) with a reduced specific gravity as a result of heating, the average specific gravity means the specific gravity of the whole fluororesin-containing sheet including this low specific gravity layer.

The average specific gravity of the sheet can be measured by water displacement. A measurement sample may have any shape and any size. For example, a sample having a length of about 2 cm and a width of about 2 cm is cut out of the sheet for measurement.

A sheet formed from the PTFE and having an average specific gravity of 2.175 or higher is formed from a highly crystalline PTFE, and thus has excellently low liquid chemical permeability. Such a highly crystalline PTFE sheet can be obtained by the method disclosed in PCT/JP98/01116, that is, by rotary firing in which a PTFE molded article obtained by compression molding of PTFE powder is fired under rotation and cutting of the resulting fired product into a sheet. A sheet cut out of a PTFE fired product obtained by a conventional method is greatly undulated. Thus, the PTFE sheet needs to be heated for flattening before preparation of a layered product. This reduces the crystallinity of PTFE before layering. On the other hand, this rotary firing can provide a uniform and highly crystalline PTFE sheet and a sheet obtained by cutting out of this sheet is flat. Thus, the resulting sheet can be easily layered with other materials and requires no flattening by heat. This can eliminate a disadvantageous reduction in crystallinity before layering.

The fluororesin-containing sheet may have a thickness that varies in accordance with the intended use. The thickness is usually 1 to 4 mm, and is about 2 to 4 mm in the case of using the fluororesin-containing sheet for a backing sheet.

The layered product of the invention includes a hot-melt resin layer. The hot-melt resin can melt during thermal bonding and impregnate into the glass cloth. Thus, the hot-melt resin layer firmly bonds to the glass cloth. The hot-melt resin layer also has excellent adhesiveness to the fluororesin-containing sheet. Thus, the hot-melt resin layer can firmly bond the fluororesin-containing sheet and the glass cloth.

The hot-melt resin layer used may be a film or sheet of a hot-melt resin. The hot-melt resin is any resin that can thermally bond to the fluororesin-containing sheet.

Examples thereof include olefinic resins having a melting point closer to the melting point of the fluororesin; aromatic resins such as PPS, PES, and PEEK; and hot-melt fluororesins such as a TFE-PAVE copolymer (PFA) and a TFE-hexafluoropropylene copolymer (FEP). Preferred among these are hot-melt fluororesins because they have properties similar to those of the fluororesin and good adhesiveness to the fluororesin. Particularly in the use for a backing sheet, PFA and FEP are preferred, and PFA is more preferred.

The hot-melt resin layer has a thickness appropriately selected in accordance with the intended use. In an exemplary case of using the hot-melt resin layer as an adhesive layer between the fluororesin-containing sheet and the glass cloth in a backing sheet, the thickness is about 10 to 300 µm.

In the layered product of the invention, the fluororesin-containing sheet, the hot-melt resin layer, and the glass cloth are preferably layered in the stated order. In other words, preferably, the fluororesin-containing sheet and the glass cloth are bonded to each other with the hot-melt resin layer in between. The hot-melt resin layer is excellent in both the adhesiveness to the fluororesin-containing sheet and the adhesiveness to the glass cloth. Thus, the above layering order can provide a layered product in which the fluororesin-containing sheet and the hot-melt resin layer are firmly bonded to each other and the hot-melt resin layer and the glass cloth are firmly bonded to each other. According to the intended use, a layer of non-fired PTFE fine particles may be provided between the fluororesin-containing sheet and the hot-melt resin layer. In the case of providing a layer of non-fired PTFE fine particles, the non-fired PTFE preferably has a melting energy (heat of fusion) of 65 J/g or lower. The melting energy (heat of fusion) is the melting energy (heat of fusion) within 290° C. to 350° C. calculated from a melting curve obtained by heating a PTFE that has never been heated up to a temperature of 300° C. or higher at a rate of 10° C./min using a differential scanning calorimeter (DSC), with the curve including at least one endothermic peak within a range of 324° C. to 347° C.

It should be noted that the absence of the layer of PTFE fine particles causes no disadvantage because, as described above, the fluororesin-containing sheet and the glass cloth are sufficiently firmly bonded to each other in the layered product of the invention.

In the layered product of the invention, more preferably, the fluororesin-containing sheet, the hot-melt resin layer, and the glass cloth are layered in the stated order, the fluororesin-containing sheet and the hot-melt resin layer are directly bonded to each other, and the hot-melt resin layer and the glass cloth are directly bonded to each other.

In the case of layering such that the hot-melt resin layer and the glass cloth are in contact with each other, the bulked glass yarn preferably appears on a surface in contact with the hot-melt resin layer of the glass cloth. More preferably, a layer impregnated with the hot-melt resin is present between strands of the bulked glass yarn on the contact surface. Still more preferably, a layer impregnated with the hot-melt resin is present between strands of the bulked glass yarn and between the glass filaments constituting the bulked glass yarn on the contact surface. These structures enable much firmer bonding of the glass cloth and the hot-melt resin layer. The layer impregnated with the hot-melt resin may be formed by impregnation of the hot-melt resin in a molten state into between strands of the glass yarn (and between the glass filaments) during thermal bonding and solidification thereof, for example.

In a particularly preferred embodiment of the layered product of the invention, the layering is such that the hot-melt resin layer and the glass cloth are in contact with each other, the glass cloth is woven in a twill pattern, and the bulked glass yarn is used for at least one selected from the warp and the weft of the glass cloth and appears on a surface in contact with the hot-melt resin layer of the glass cloth.

In another particularly preferred embodiment of the layered product of the invention, the bulked glass yarn includes intertwined glass filaments, and the glass cloth includes, on a surface in contact with the hot-melt resin layer, a layer impregnated with the hot-melt resin between strands of the bulked glass yarn and between the glass filaments.

The layered product of the invention can be produced by a method of layering and thermally bonding the fluororesin-containing sheet, a film or sheet of the hot-melt resin, and the glass cloth.

In the case of layering the fluororesin-containing sheet, the film or sheet of the hot-melt resin, and the glass cloth in the stated order in the method for producing the layered product of the invention, heating is preferably such that the heat is applied from the glass cloth side. The heating is preferably stopped at the time when an un-melting layer remains in the fluororesin-containing sheet.

The heating temperature is not lower than the melting point of the fluororesin. For example, when the fluororesin is PTFE, the heating temperature is about 360° C. to 400° C., preferably about 360° C. to 390° C. The heating is preferably stopped at this temperature in a state that an un-melting portion (layer) remains in the fluororesin. In other words, the amount of heat applied is controlled to allow crystals to remain in the fluororesin-containing sheet. Complete melting of crystals may cause a significant decrease in specific gravity to lower than 2.175, resulting in high liquid chemical permeability.

The heating duration varies in accordance with factors such as the heating temperature, the thickness of the fluororesin-containing sheet, the type and thickness of the hot-melt resin, and the thickness of the glass cloth. The heating duration may be selected experimentally or may be calculated from values such as the crystallinity. In an exemplary case where the fluororesin is PTFE, the sheet has a specific gravity of 2.189 and a thickness of 3 mm, and the heating temperature is 380° C., the heating duration is 3 to 5 minutes.

Whether a partially non-molten portion remains or not can be determined by observing a section of the fluororesin-containing sheet. Specifically, a highly crystalline sheet before heating looks white and opaque, while a sheet after crystals are molten looks transparent. Thus, the section includes a transparent portion (layer) on the hot-melt resin side and a white opaque layer on the non-heated side.

The thermal bonding is preferably performed using a heating roller. FIG. 1 is a schematic view of an exemplary thermal bonding method using a heating roller. As illustrated in FIG. 1, a layered structure of a fluororesin sheet 1, a hot-melt resin film or sheet 2, and a glass cloth 3 layered in the stated order is rolled around a heating roller 4 heated up to not lower than the melting point of the fluororesin such that the glass cloth 3 is in contact with the surface of the heating roller 4, and the layers are thermally bonded while pressed by a press roller 5, whereby the layered product is continuously produced.

The pressure in pressing may be selected within a range of about 0.05 to 0.15 MPa, for example. In order to increase the crystallinity, preferably, the pressure is released after the heating and the product is gradually cooled down to room temperature. There is basically no need to heat the press roller 5. Still, in order to remove deformation of the layered product, the press roller 5 may be heated to a temperature that is lower than the melting point of the fluororesin, preferably a temperature that is 15° C. to 35° C. lower than the melting point of the fluororesin.

The layered product of the invention has excellent interlayer adhesiveness and excellently low liquid chemical permeability, and is useful as a backing sheet for lining of a variety of storage or transport containers, tanks, and pipelines in fields such as the semiconductor manufacturing field. In addition, the layered product of the invention is suitable for applications such as mold release and sliding applications owing to the characteristics of the fluororesin such as non-stickiness and low friction.

EXAMPLES

The invention is described in more detail with reference to examples. Still, the invention is not intended to be limited to these examples.

Example 1

Figure 2:
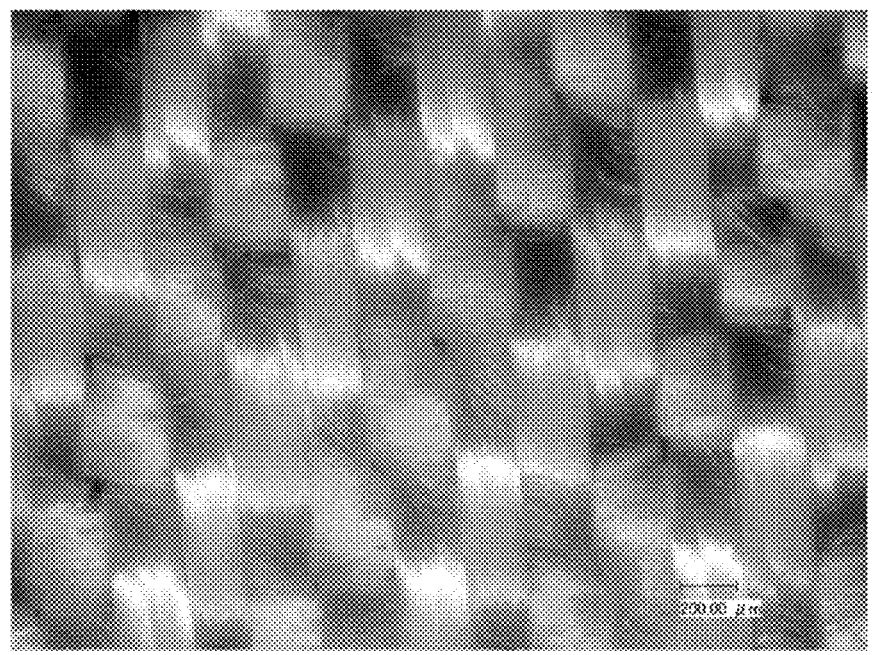
FIG. 2 is a photograph of a glass cloth 3 used in Example 1.

In FIG. 1, a layered structure was rolled around a heating roller 4 heated up to 390° C. to 400° C. so as to be in contact with the surface of the heating roller 4. The layered structure includes a PTFE sheet 1 (PAVE-modified PTFE sheet having a specific gravity of 2.191, width: 1180 mm, thickness: 2.4 mm) prepared by rotary firing (the method disclosed in Example 2 of PCT/JP98/01116) and cutting, a PFA film 2 (width: 1180 mm, thickness: 0.1 mm), and a glass cloth 3 (width: 1200 mm, density (warp): 53 strands/25 mm, density (weft): 30 strands/25 mm, mass: 320 g/m$^2$, thickness: 0.3 mm) prepared by twilling a bulked glass yarn having a bulking percentage of 111% layered in the stated order. The layers were thermally bonded while pressed by a press roller 5, whereby a layered product was continuously produced (line speed: 80 mm/min). FIG. 2 is a photograph of the glass cloth 3.

This layered product was divided into 10 equal parts in the PTFE sheet width direction. A sample having a width of 30 mm and a length of 150 mm was cut out of each part and, for each sample, the bond strength (peel strength) between the resin layer, which is a laminate of the PTFE sheet 1 and the PFA film 2, and the glass cloth 3 was determined in conformity with JIS K 6772-9-5. The average thereof was 3.7 kN/m.

Observation of the peeled surface of the glass cloth after the bond strength test confirmed the presence of the bulked glass yarn. The observation further confirmed remaining of the PFA component in the meshes of the bulked glass yarn on the same peeled surface.

The whole PTFE sheet had an average specific gravity of 2.175. Observation of a section of the PTFE sheet confirmed that about 33% portion of the section from the PFA film side was molten and therefore looked semi-transparent.

Comparative Example 1

Figure 3:
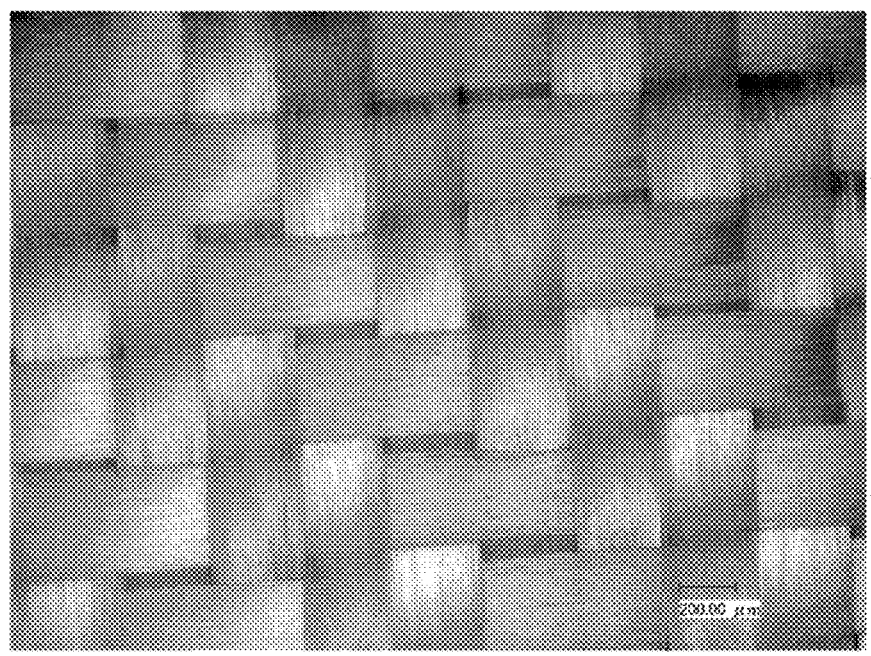
FIG. 3 is a photograph of a glass cloth 3-2 used in Comparative Example 1.

A layered product was continuously produced in the same manner as in Example 1, except that a glass cloth 3-2 produced by twilling a non-bulked glass yarn (straight yarn) was used instead of the bulked glass cloth 3 used in Example 1. FIG. 3 is a photograph of the glass cloth 3-2.

The bond strength (peel strength) between the resin layer, which is a laminate of the PTFE sheet 1 and the PFA film 2, and the glass cloth 3-2 determined as in Example 1 was only 1.7 kN/m.

Observation of the peeled surface of the glass cloth after the bond strength test confirmed the presence of only the non-bulked glass yarn (straight yarn) and failed to confirm remaining of the PFA component in the meshes of the glass yarn.

Comparative Example 2

A layered product was continuously produced in the same manner as in Example 1, except that the PFA film 2 used in Example 1 was not used and only the PTFE sheet 1 and the bulked glass cloth 3 were used.

The bond strength (peel strength) between the PTFE sheet 1 and the glass cloth 3 determined as in Example 1 was only 0.7 kN/m.

Observation of the peeled surface of the glass cloth after the bond strength test confirmed the presence of the bulked glass yarn, but failed to confirm remaining of the PTFE component in the meshes of the glass yarn.

REFERENCE SIGNS LIST

1: fluororesin-containing sheet
2: hot-melt resin film or sheet
3: glass cloth
4: heating roller
5: press roller

The invention claimed is:

1. A layered product comprising, in a layered structure:
  a fluororesin-containing sheet;
  a hot-melt resin layer; and
  a glass cloth,
  the glass cloth being a fabric including a bulked glass yarn,
  wherein the fluororesin-containing sheet is a polytetrafluoroethylene (PTFE) sheet having an average specific gravity of 2.175 or higher and a thickness of 1 to 4 mm, and
  wherein the bulked glass yarn includes intertwined glass filaments,
  the glass cloth includes, on a surface in contact with the hot-melt resin layer, a layer impregnated with the hot-melt resin between strands of the bulked glass yarn and between the glass filaments.

2. The layered product according to claim 1,
  wherein the hot-melt resin layer and the glass cloth are layered so as to be in contact with each other,
  the glass cloth is woven in a twill pattern,
  the bulked glass yarn is used for at least one selected from a warp and a weft of the glass cloth and appears on a surface in contact with the hot-melt resin layer of the glass cloth.

3. The layered product according to claim 1,
  wherein the bulked glass yarn has a bulking percentage of 101% to 150%.

* * * * *